July 23, 1935.                M. JUNGE                2,009,371

CHANGE GEAR MECHANISM

Filed June 12, 1934

Inventor: M. Junge
By Karl Viertel
Attorney

Patented July 23, 1935

2,009,371

UNITED STATES PATENT OFFICE 2,009,371

CHANGE GEAR MECHANISM

Max Junge, Chemnitz, Germany, assignor to J. E. Reinecker, A. G., Chemnitz, Germany Application June 12, 1934, Serial No. 730,244

3 Claims. (Cl. 287—53)

My invention relates to change speed gears, feed and kindred mechanisms as applied to and forming important parts for instance of machine tools of various kinds—including lathes, milling- and gear cutting machines, planers, shapers,— and more especially to improvements in speed and feed mechanisms of the type comprising different sets of exchangeable gear wheels—briefly hereinafter called "change wheels"—which are adapted to be removed by hand from their respective shafts and to be replaced by other change wheels of different size.

As a matter of fact known to practitioners much care and attention is required on the part of the operator of the machine for properly exchanging by hand change wheels, and incidentally much time is lost particularly in unlocking with the aid of tools and other implements, such as screw drivers, wrenches, tongs etc. of special design, the change wheels to be withdrawn from their shafts, and in properly relocking the wheels put into the place of the former, so as to secure them against being accidentally displaced in axial direction and becoming unintentionally disengaged from their fellow gear wheels.

The primary object of this invention is to eliminate the said drawbacks by providing an improved time-saving device or attachment of relatively simple construction for change speed gears and feed mechanism of machine tools, so designed as to enable the operator of the machine to unlock, withdraw, replace and re-lock the respective change wheels in a minimum of time viz. quicker than it has been possible heretofore.

The invention further aims at so designing the improved locking device that it can be subsequently applied and at relatively low cost to existing machines, and that the change wheels concerned can be unlocked and re-locked simply by hand, without any tools or accessorial implements of the kind referred to above.

Other objects of the invention will incidentally become apparent hereinafter to practitioners in this field.

Figure 1:
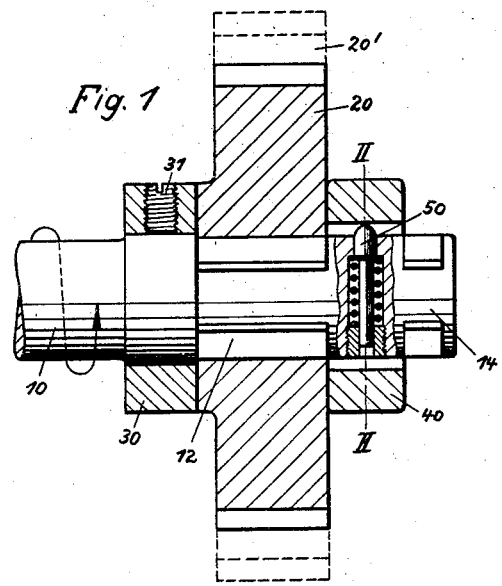
Figure 2:
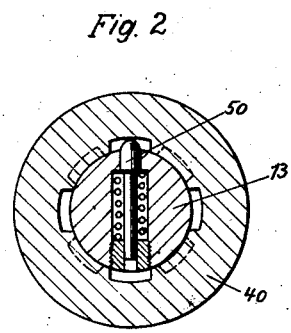
Figure 1A:
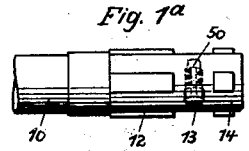
Figure 3:
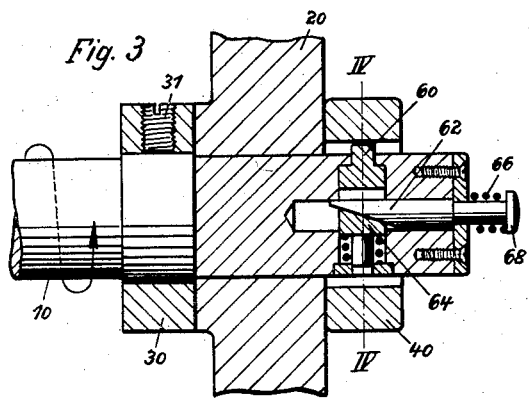
Figure 4:
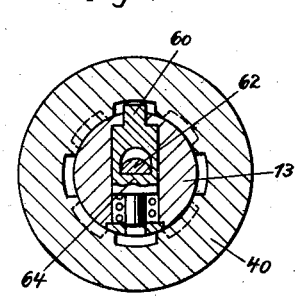
Figure 5:
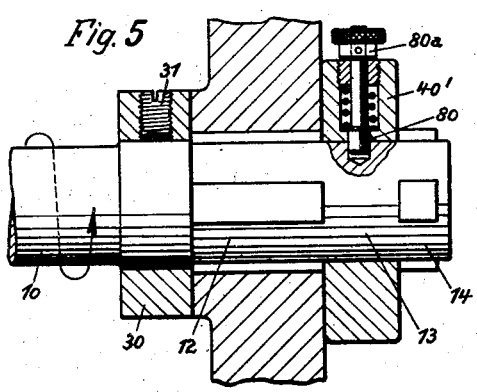
Figure 6:
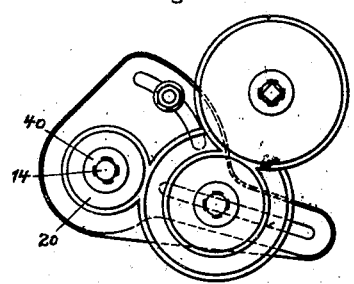

The nature and scope of the invention are briefly outlined in the appended claims and will be more fully understood from the following specification taken together with the accompanying drawing in which:

Fig. 1 is a longitudinal section axially taken through a locking device designed according to this invention and shown by way of an example, Fig. 1a is a side elevation showing in a smaller scale the end of a rotary shaft on which the respective change wheels are to be exchangeably fixed, Fig. 2 is a cross section on line II—II of Fig. 1, Fig. 3 is a longitudinal section axially taken through a locking device of different design, Fig. 4 is a cross section on line IV—IV in Fig. 3, Fig. 5 shows in cross section another structurally modified locking device designed according to this invention, Fig. 6 shows diagrammatically and by way of an example a typical change speed mechanism for gear cutting machines furnished with locking devices according to this invention.

The time-saving device, shown and described hereinafter, for locking the change wheels of change-speed gears and kindred mechanisms of machine tools and like machines is distinguished from devices of the same class known heretofore by the absence of nuts, screws, cotter pins and like fastening and clamping elements.

The improved locking device essentially consists of a cotter ring designed on the order of self-locking spring lock of the bayonet type, i. e. it can be put into its operative position by a simple rectilinear motion in axial direction and a subsequent angular motion through a relatively small angle.

In the embodiments of the invention shown in the drawing by way of examples the change gear mechanism and its locking device comprise:

(1) A rotary shaft 10 having a multiple spline end portion; the latter is formed according to this invention with an intersecting plain-surfaced zone 13 so as to present two splined sections, an inner one 12 and an outer section 14, which are spaced from each other;

(2) An exchangeable gear wheel 20 which slidably fits upon the inner splined section 12 of shaft 10;

(3) An adjusting ring 30 as commonly used, which is secured by a clamping screw 31 upon shaft 10;

(4) A grooved cotter ring 40 adapted to slidably pass over the outer splined section 14 of the shaft 10 and to fit over the plain surfaced zone 13; said ring 40 is adapted to be turned around the plain surfaced zone 12 through an angle so as to be out of register with the outer splined section 14 and to be locked by the latter against axial displacement;

(5) Spring actuated means for locking said cotter ring 40 against angular displacements while being in its operative position on the plain surfaced zone 13 of shaft 10.

In the embodiment of the invention, shown in Figs. 1, 1a, and 2, the said spring actuated locking means comprise a spring loaded detent 50 slidably fitted in the plain surfaced section 13 of the shaft; the rounded head portion of said detent projects into one of the grooves of the cotter ring 40; by returning the cotter ring 40 into register with the outer splined section 14 of the shaft the detent 50 is concurrently thrown out of engagement with the cotter ring, which thereupon can be withdrawn by the operator.

In the structurally modified embodiment of the invention shown in Figs. 3 and 4 the said spring actuated locking means comprise a spring loaded catch bolt 60, slidably fitted in the plain surfaced section 13 of the shaft and projecting therefrom so as to engage one of the grooves of the cotter ring 40; the said catch bolt 60 is cooperatively associated with a wedge shaped push pin 62 which slidably fits over a corresponding wedge shaped portion 64 of the bolt 60; push pin 62 is also preferably loaded by spring 66 and presents a handle 68, which enables the operator to unlock in a moment the cotter ring by simply pushing back pin 62 with the palm of his hand and subsequently returning and withdrawing with his fingers the cotter ring. On having removed the cotter ring the change wheel 20 on duty is ready to be replaced by another one 20' of different size.

Various other changes and modifications may be conveniently made in the structural details of change gear mechanism provided with locking devices of the improved design described hereinbefore, without departing from the spirit and the salient ideas of this invention:

Instead of providing a catch bolt in the shaft 10 for cooperation with the cotter ring 40, the catch bolt may be arranged in the cotter ring for cooperation with the shaft, as shown in Fig. 5: The spring-loaded catch bolt 80 is slidably fitted in the cotter ring 40', the inner end of said bolt engaging a corresponding hole in the shaft, while the outer end of the bolt, to which a knurled boss 80a is secured serves as a handle for withdrawing the bolt out of engagement with the shaft.

What I claim is:

1. A change gear mechanism for the purpose set forth comprising a rotary shaft having a multiple spline end portion, the latter being formed with an intersecting plain-surfaced zone, so as to present two splined sections, an inner one and an outer one, spaced from each other, a change gear wheel fitting upon the inner splined zone of the shaft and having a sliding joint therewith, a grooved cotter ring slidably fitting over the outer splined section of the shaft and over the plain surfaced zone and being adapted to be turned thereon through a relatively small angle and additional locking means for locking the said cotter ring against angular displacements,—said additional locking means comprising a spring loaded bolt, slidably mounted in the shaft and having a rounded head which engages one of the grooves of the cotter ring.

2. A change gear mechanism for the purpose set forth comprising a rotary shaft having a multiple spline end portion, the latter being formed with an intersecting plain-surfaced zone, so as to present two splined sections, an inner one and an outer one, spaced from each other, a change gear wheel fitting upon the inner splined zone of the shaft and having a sliding joint therewith, a grooved cotter ring slidably fitting over the outer splined section of the shaft and over the plain surfaced zone and being adapted to be turned thereon through a relatively small angle and additional locking means for locking the said cotter ring against angular displacements,—said additional locking means comprising a spring loaded bolt, slidably mounted in the shaft and having a head which engages one of the grooves of the cotter ring,—said bolt being cooperatively associated with a wedge shaped push pin, the latter slidably fitting over a corresponding wedge shaped portion of the said catch bolt.

3. A change gear mechanism for the purpose set forth comprising a rotary shaft having a multiple spline end portion, the latter being formed with an intersecting plain-surfaced zone, so as to present two splined sections, an inner one and an outer one, spaced from each other, a change gear wheel fitting upon the inner splined zone of the shaft and having a sliding joint therewith, a grooved cotter ring slidably fitting over the outer splined section of the shaft and over the plain surfaced zone and being adapted to be turned thereon through a relatively small angle and additional locking means for locking the said cotter ring against angular displacements,—said additional locking means comprising a spring loaded bolt, slidably mounted in the shaft and having a head which engages one of the grooves of the cotter ring,—said bolt being cooperatively associated with a wedge shaped push pin, the latter slidably fitting over a corresponding wedge shaped portion of the said catch bolt,—said push pin being loaded by a spring and projecting from the splined end of the shaft so as to present a handle.

MAX JUNGE.